United States Patent
Jain et al.

(10) Patent No.: US 10,015,767 B2
(45) Date of Patent: Jul. 3, 2018

(54) ENHANCING OTDOA BSA ACCURACY USING UNSOLICITED RSTD MEASUREMENTS

(71) Applicant: QUALCOMM Incorporated, San Diego, CA (US)

(72) Inventors: Amit Jain, San Diego, CA (US); Harisrinivas Chandrasekar, San Diego, CA (US); Gautam Nirula, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/264,834

(22) Filed: Sep. 14, 2016

(65) Prior Publication Data

US 2018/0077670 A1   Mar. 15, 2018

(51) Int. Cl.
| | |
|---|---|
| *H04W 64/00* | (2009.01) |
| *G01S 1/04* | (2006.01) |
| *G01S 1/20* | (2006.01) |
| *G01S 5/00* | (2006.01) |
| *G01S 5/02* | (2010.01) |
| *G01S 5/10* | (2006.01) |
| *H04W 88/18* | (2009.01) |

(52) U.S. Cl.
CPC ............ *H04W 64/00* (2013.01); *G01S 1/045* (2013.01); *G01S 1/20* (2013.01); *G01S 5/0036* (2013.01); *G01S 5/0236* (2013.01); *G01S 5/10* (2013.01); *H04W 88/18* (2013.01)

(58) Field of Classification Search
CPC .............................. H04W 64/00; H04W 88/18
See application file for complete search history.

(56) References Cited

U.S. PATENT DOCUMENTS

| | | | | |
|---|---|---|---|---|
| 2008/0293400 | A1* | 11/2008 | Okabe | H04W 24/02 455/423 |
| 2011/0201332 | A1 | 8/2011 | Siomina et al. | |
| 2011/0275385 | A1* | 11/2011 | Escolar-Piedras | H04W 64/00 455/456.1 |
| 2012/0108270 | A1* | 5/2012 | Kazmi | H04W 64/00 455/456.5 |

(Continued)

FOREIGN PATENT DOCUMENTS

| | | |
|---|---|---|
| EP | 1962535 A1 | 8/2008 |
| WO | 2010151217 A2 | 12/2010 |

OTHER PUBLICATIONS

Fischer S., "Introduction to OTDOA on LTE Networks", Qualcomm Technologies, Inc., Aug. 7, 2014, pp. 1-18.

(Continued)

*Primary Examiner* — Qun Shen
(74) *Attorney, Agent, or Firm* — Kilpatrick Townsend & Stockton, LLP

(57) ABSTRACT

Techniques disclosed herein help a location server identify inaccuracies in a list of neighboring cells provided by the location server by enabling mobile devices to, during an OTDOA session to opportunistically take Reference Signal Time Difference (RSTD) measurements of additional cells not on the neighboring cell list. The mobile device can then provide these RSTD measurements back to the server, which can optimize its algorithm for determining neighboring cells based on these measurements.

23 Claims, 5 Drawing Sheets

(56) References Cited

U.S. PATENT DOCUMENTS

| | | | | |
|---|---|---|---|---|
| 2012/0307670 A1* | 12/2012 | Kazmi | ............ | H04W 24/10 |
| | | | | 370/252 |
| 2012/0314604 A1 | 12/2012 | Siomina et al. | | |
| 2013/0089029 A1* | 4/2013 | Jang | ............ | H04W 48/16 |
| | | | | 370/328 |
| 2013/0188510 A1* | 7/2013 | Siomina | ............ | H04W 24/10 |
| | | | | 370/252 |
| 2014/0213257 A1* | 7/2014 | Ryan | ............ | H04W 36/0083 |
| | | | | 455/436 |
| 2015/0018010 A1* | 1/2015 | Fischer | ............ | H04W 4/023 |
| | | | | 455/456.2 |
| 2015/0105097 A1* | 4/2015 | Sun | ............ | H04W 64/003 |
| | | | | 455/456.1 |
| 2017/0164225 A1* | 6/2017 | Yu | ............ | H04W 24/10 |

OTHER PUBLICATIONS

International Search Report and Written Opinion—PCT/US2017/048269—ISA/EPO—dated Nov. 21, 2017.

\* cited by examiner

ENHANCING OTDOA BSA ACCURACY USING UNSOLICITED RSTD MEASUREMENTS

BACKGROUND

In a cellular network, such as a Long-Term Evolution (LTE) network, a mobile device and a location server may engage in an Observed Time Difference of Arrival (OTDOA) session in which the location server calculates the location of the mobile device based on the mobile device's measurement of signals from cells (or base stations) of the cellular network, and the location server's knowledge of cell locations, which can be stored in a base station almanac (BSA). Problematically, the list of neighboring cells provided by the location server may include many cells that might not be neighboring cells, and may exclude neighboring cells that should more logically be on the list. Ultimately, this inaccuracy in the list of neighboring cells can result in a less accurate location determination.

SUMMARY

Techniques disclosed herein help a location server identify inaccuracies in a list of neighboring cells provided by the location server by enabling mobile devices to, during an OTDOA session to opportunistically take Reference Signal Time Difference (RSTD) measurements of additional cells not on the neighboring cell list. The mobile device can then provide these RSTD measurements back to the server, which can optimize its algorithm for determining neighboring cells based on these measurements.

An example method of providing measurement information to a location server for position determination of a mobile device, according to the description, comprises sending, from the mobile device, serving cell information to the location server, receiving, at the mobile device, a list of neighboring cells based on the serving cell information, and determining, at the mobile device, Reference Signal Time Difference (RSTD) measurements of at least a portion of the cells on the list of neighboring cells. The method further comprises determining, at the mobile device, additional RSTD measurements of one or more cells that are not on the list of neighboring cells, and sending, to the location server, the RSTD measurements of both the at least a portion of the cells on the list of neighboring cells and the one or more cells that are not on the list of neighboring cells.

The method can further comprise one or more of the following features. The method may further comprise determining the additional RSTD measurements during a designated timeout period. Determining the additional RSTD measurements may comprise receiving a Positioning Reference Signal (PRS) from each of a plurality of cells that are not on the list of neighboring cells, wherein the one or more cells that are not on the list of neighboring cells comprise cells of the plurality of cells for which a signal-to-noise ratio of the PRS was greater than a threshold value. The method may further comprise generating, with the mobile device, assistance data with which the additional RTSD measurements are determined. The assistance data may be generated by a measurement engine of the mobile device and the additional RTSD measurements may be determined by a communication interface of the mobile device. The assistance data may include a physical cell identifier (PCI) of each of the one or more cells that is not on the list of neighboring cells. The method may be performed during an Observed Time Difference of Arrival (OTDOA) session between the mobile device and the location server. The serving cell information may comprise at least one of a mobile network code (MNC), a mobile carrier code (MCC), or a physical cell identifier (PCI), or any combination thereof.

An example mobile device, according to the description, can comprise a wireless communication interface, a memory, and a processing unit communicatively coupled with the wireless communication interface and the memory. The processing unit can be configured to cause the mobile device to send, via the wireless communication interface, serving cell information to a location server, receive, via the wireless communication interface, a list of neighboring cells based on the serving cell information, and determine Reference Signal Time Difference (RSTD) measurements of at least a portion of the cells on the list of neighboring cells. The processing unit can be further configured to cause the mobile device to determine additional RSTD measurements of one or more cells that are not on the list of neighboring cells, and send, via the wireless communication interface to the location server, the RSTD measurements of both the at least a portion of the cells on the list of neighboring cells and the one or more cells that are not on the list of neighboring cells.

The mobile device may further include one or more of the following features. The processing unit may be further configured to cause the mobile device to determine the additional RSTD measurements during a designated timeout period. The processing unit may be further configured to cause the mobile device to determine the additional RSTD measurements by receiving a Positioning Reference Signal (PRS) from each of a plurality of cells that are not on the list of neighboring cells, wherein the one or more cells that are not on the list of neighboring cells comprise cells of the plurality of cells for which a signal-to-noise ratio of the PRS was greater than a threshold value. The processing unit may be further configured to cause the mobile device to generate assistance data with which the additional RTSD measurements are determined. The mobile device may further comprise a measurement engine, wherein the assistance data is generated by the measurement engine and the additional RTSD measurements are determined by the wireless communication interface. The processing unit may be further configured to cause the mobile device to receive the assistance data that includes a physical cell identifier (PCI) of each of the one or more cells that is not on the list of neighboring cells. The processing unit may be further configured to cause the mobile device to send the RSTD measurements of both the at least a portion of the cells on the list of neighboring cells and the one or more cells that are not on the list of neighboring cells during an Observed Time Difference of Arrival (OTDOA) session between the mobile device and the location server. The processing unit may be further configured to cause the mobile device to include, in the serving cell information, at least one of a mobile network code (MNC), a mobile carrier code (MCC), or a physical cell identifier (PCI), or any combination thereof.

An example apparatus, according to the description, can comprise means for sending serving cell information to a location server, means for receiving a list of neighboring cells based on the serving cell information, and means for determining Reference Signal Time Difference (RSTD) measurements of at least a portion of the cells on the list of neighboring cells. The apparatus may further comprise means for determining additional RSTD measurements of one or more cells that are not on the list of neighboring cells, and means for sending, to the location server, the RSTD measurements of both the at least a portion of the cells on the list of neighboring cells and the one or more cells that are not on the list of neighboring cells.

The apparatus may further include one or more of the following features. The apparatus may further comprise means for determining the additional RSTD measurements during a designated timeout period. The means for determining the additional RSTD measurements may comprise means for receiving a Positioning Reference Signal (PRS) from each of a plurality of cells that are not on the list of neighboring cells, wherein the one or more cells that are not on the list of neighboring cells comprise cells of the plurality of cells for which a signal-to-noise ratio of the PRS was greater than a threshold value. The apparatus may further comprise means for generating assistance data with which the additional RTSD measurements are determined. The assistance data may be generated by a measurement means and the additional RTSD measurements are determined by a communication means. The means for generating assistance data may include means for including, in the assistance data, a physical cell identifier (PCI) of each of the one or more cells that is not on the list of neighboring cells. The apparatus may further comprise means for including, in the serving cell information, at least one of a mobile network code (MNC), a mobile carrier code (MCC), or a physical cell identifier (PCI), or any combination thereof.

An example non-transitory computer-readable medium, according to the description, can have instructions embedded therein for providing measurement information to a location server for position determination of a mobile device. The instructions can include computer code for sending serving cell information to the location server, receiving a list of neighboring cells based on the serving cell information, and determining Reference Signal Time Difference (RSTD) measurements of at least a portion of the cells on the list of neighboring cells. The instructions can further include computer code for determining additional RSTD measurements of one or more cells that are not on the list of neighboring cells, and sending, to the location server, the RSTD measurements of both the at least a portion of the cells on the list of neighboring cells and the one or more cells that are not on the list of neighboring cells.

The non-transitory computer-readable medium may further include instructions for performing one or more of the following features. The instructions further may comprise computer code for determining the additional RSTD measurements during a designated timeout period. The computer code for determining the additional RSTD measurements may comprise computer code for receiving a Positioning Reference Signal (PRS) from each of a plurality of cells that are not on the list of neighboring cells, wherein the one or more cells that are not on the list of neighboring cells comprise cells of the plurality of cells for which a signal-to-noise ratio of the PRS was greater than a threshold value. The instructions further may comprise computer code for generating assistance data with which the additional RTSD measurements are determined. The instructions further may comprise computer code for including, in the serving cell information, at least one of a mobile network code (MNC), a mobile carrier code (MCC), or a physical cell identifier (PCI), or any combination thereof.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

A cellular (or mobile) network can be used to determine the location of the mobile device in communication with the cellular network. Such functionality can be desirable not only to provide the mobile device with a calculated location for navigation and/or other applications, but also to provide the network with a location of the mobile device in cases of emergency (e.g., E911 calls). To determine the location of the mobile device, a location server of the cellular network can perform an Observed Time Difference of Arrival (OTDOA) session with the mobile device in which the location server calculates the location of the mobile device based on the mobile device's measurements of signals from cells (or base stations) of the cellular network, as well as the location server's knowledge of the cell locations, which can be stored in a base station almanac (BSA) maintained by the location server. It can be noted that the terms "mobile device" and "user equipment" (UE) are generally used interchangeably herein, as are the terms "cell" and "base station." Additionally, the term "base station almanac" (BSA), as used herein, can apply to any database and/or other data structure maintained by the location server, cellular communication network, and/or other entity to store location information regarding one or more cells of the cellular network. Furthermore, embodiments herein are described in the context of OTDOA sessions with a mobile device using Reference Signal Time Difference (RSTD) measurements in a cellular network, but techniques described herein can be implemented in other applications using other session, device, measurement, and/or data network types, as a person of ordinary skill in the art will appreciate.

Figure 1:
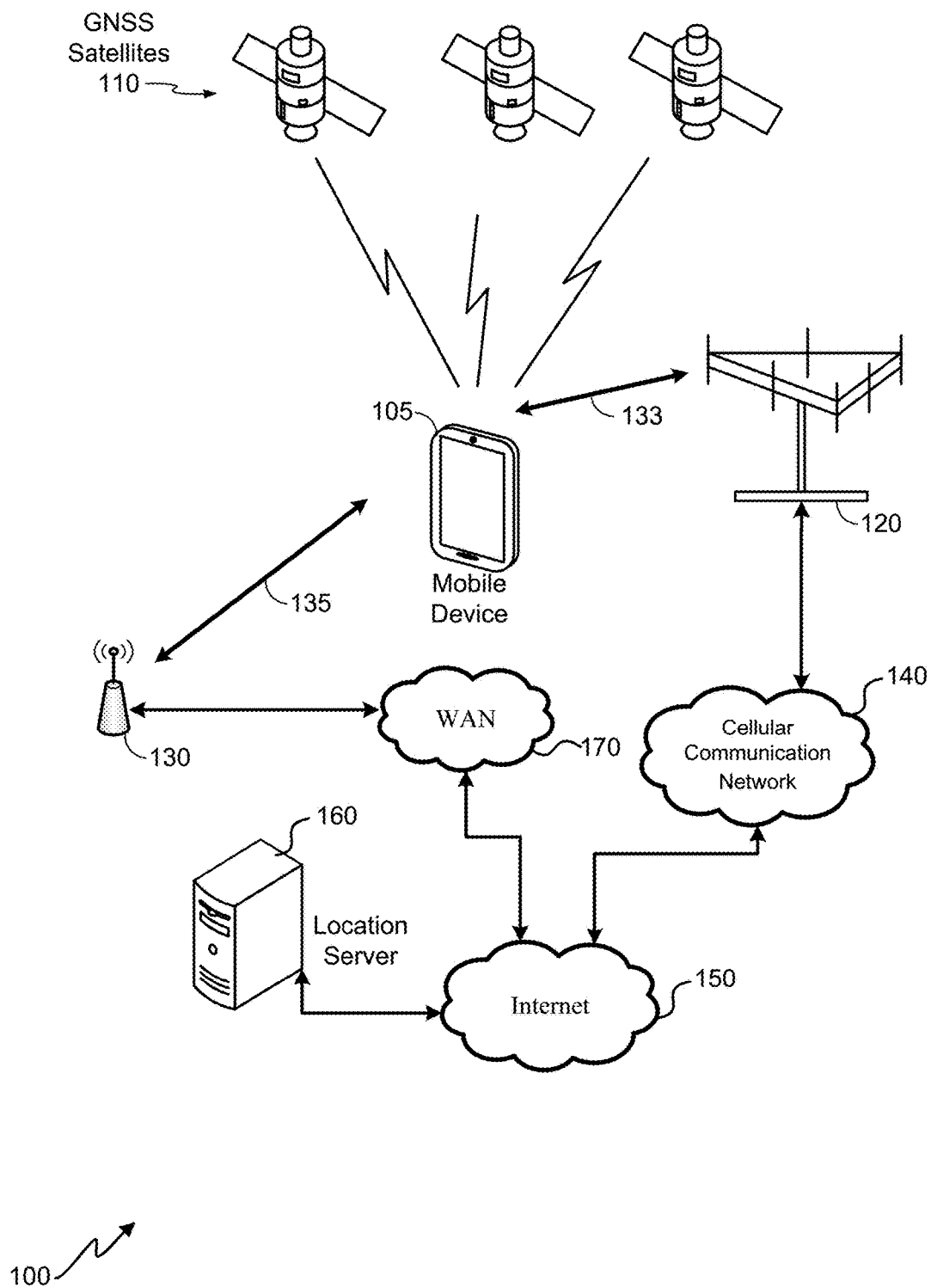
FIG. 1 is a simplified illustration of a positioning system that can be used to perform the techniques described herein, according to an embodiment.

FIG. 1 is a simplified illustration of a positioning system 100 in which a mobile device 105 and/or other components of the positioning system 100 can use the techniques provided herein for helping enhance the accuracy of a BSA using unsolicited RSTD measurements, according to an embodiment. The techniques described herein may therefore be implemented by one or more components of the positioning system 100. The positioning system can include a mobile device 105, global navigation satellite system (GNSS) satellite vehicles (SVs) 110, cellular transceiver(s) 120 (also generically referred to herein as "cells"), cellular communication network 140, local transceiver(s) 130, location server 160, wireless area network (WAN) 170, and the Internet 150. It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may be utilized in the positioning system 100. Similarly, the positioning system 100 may include many cellular transceivers 120 and/or local transceivers 130. In some embodiments, the mobile device 105 may not be equipped to receive signals from GNSS SVs 110. The illustrated connections that connect the various components in the positioning system 100 comprise data connections which may include additional (intermediary) components, direct or indirect connections, and/or additional networks. Furthermore, components may be rearranged, combined, separated, substituted, and/or omitted, depending on desired functionality. A person of ordinary skill in the art will recognize many modifications to the components illustrated.

The cellular transceiver 120, which may comprise a wireless base transceiver subsystem (BTS), a Node B or an evolved NodeB (eNodeB), can be communicatively coupled to the cellular communication network 140, which, in turn, may be communicatively coupled with the Internet 150. In some embodiments, the cellular transceiver 120 may comprise a base station of a cellular network, which may employ any of a variety of wireless technologies, as described herein below with regard to FIG. 5. The location server 160 can also be communicatively coupled with the Internet 150. Thus, the mobile device 105 can communicate information with the location server 160, for example, by accessing the Internet 150 via the cellular transceiver 120 using a first communication link 133. Additionally or alternatively, the mobile device 105 may communicate with a local transceiver 130 over a second communication link 135. A local transceiver 130 may comprise an access point (AP), femtocell, Home Base Station, small cell base station, Home Node B (HNB) or Home eNodeB (HeNB) and may provide access to a wireless area network (WAN), such as a wireless local area network (WLAN) (e.g., IEEE 802.11 network), a wireless personal area network (WPAN, e.g., Bluetooth® network) and/or the like. Because the local transceiver 130 and WAN 170 also may be communicatively coupled with the Internet 150, the mobile device 105 may communicate with the location server 160 using a second communication link 135.

Depending on desired functionality, a location of the mobile device 105 can be determined in any of a variety of ways, by the mobile device 105 and/or other devices in communication with the mobile device 105, which may be situation dependent. In some embodiments, the location server 160 and/or other devices (not shown) remote to the mobile device 105, for example, can be used to implement positioning methods for supporting the positioning of a mobile device 105, typically referred to as a target mobile device, target device, or target. These positioning methods may comprise, for example, measurements by a mobile device of signals transmitted by GNSS SVs 110, cellular transceivers 120 (e.g., cells belonging to the cellular communication network 140), local transceivers 130, and the like.

Some positioning methods may involve the mobile device 105 and the location server 160 engaging in an OTDOA session in which the location server receives RSTD measurements made by the mobile device 105 of cellular transceivers 120 and calculates the position of the mobile device 105, based on the location server's knowledge of the cellular transceivers' locations. The OTDOA session can proceed generally as follows. First, the mobile device 105 provides the location server 160 with information regarding a serving cell (e.g., a cellular transceiver 120 with which the mobile device 105 has a first communication link 133). Second, using the serving cell information, the location server 160 provides a list of neighboring cells to the mobile device 105. Third, the mobile device 105 uses the list to scan for a Positioning Reference Signal (PRS) from each cell on the list and make Reference Signal Time Difference (RSTD) measurements. Finally, the mobile device 105 sends the RSTD measurements for those cells to the location server 160. Because the location server 160 can maintain an almanac (e.g. a BSA) that includes the location of the neighboring cells, the location server can use these locations to calculate the position of the mobile device 105, based on the RSTD measurements provided by the mobile device 105 and the known locations of the neighboring cells.

The information first provided to the location server 160 by the mobile device 105 regarding the serving cell can vary, depending on desired functionality. This information can include, for example, a physical cell identifier (PCI), a mobile country code (MCC), and/or a mobile network code (MNC). Because the serving cell has a limited coverage region, and because the location server 160 knows the location of the serving cell (e.g., from location information stored in a BSA), the location server 160 can then utilize the information provided by the mobile device 105 to determine an approximate location of the mobile device 105 and generate the list of neighboring cells based on this approximate location. The list can also be determined using location information from a BSA or similar database indicating the location of cellular transceivers 120, which may be maintained by the location server 160. Problematically, traditional algorithms used by the location server 160 to generate the list of neighboring cells from the information provided by the mobile device 105 may be faulty, resulting in a list of "neighboring cells" that includes cells that are not close (e.g. within a threshold distance) to the mobile device 105 and/or does not include cells that are.

Figure 2:
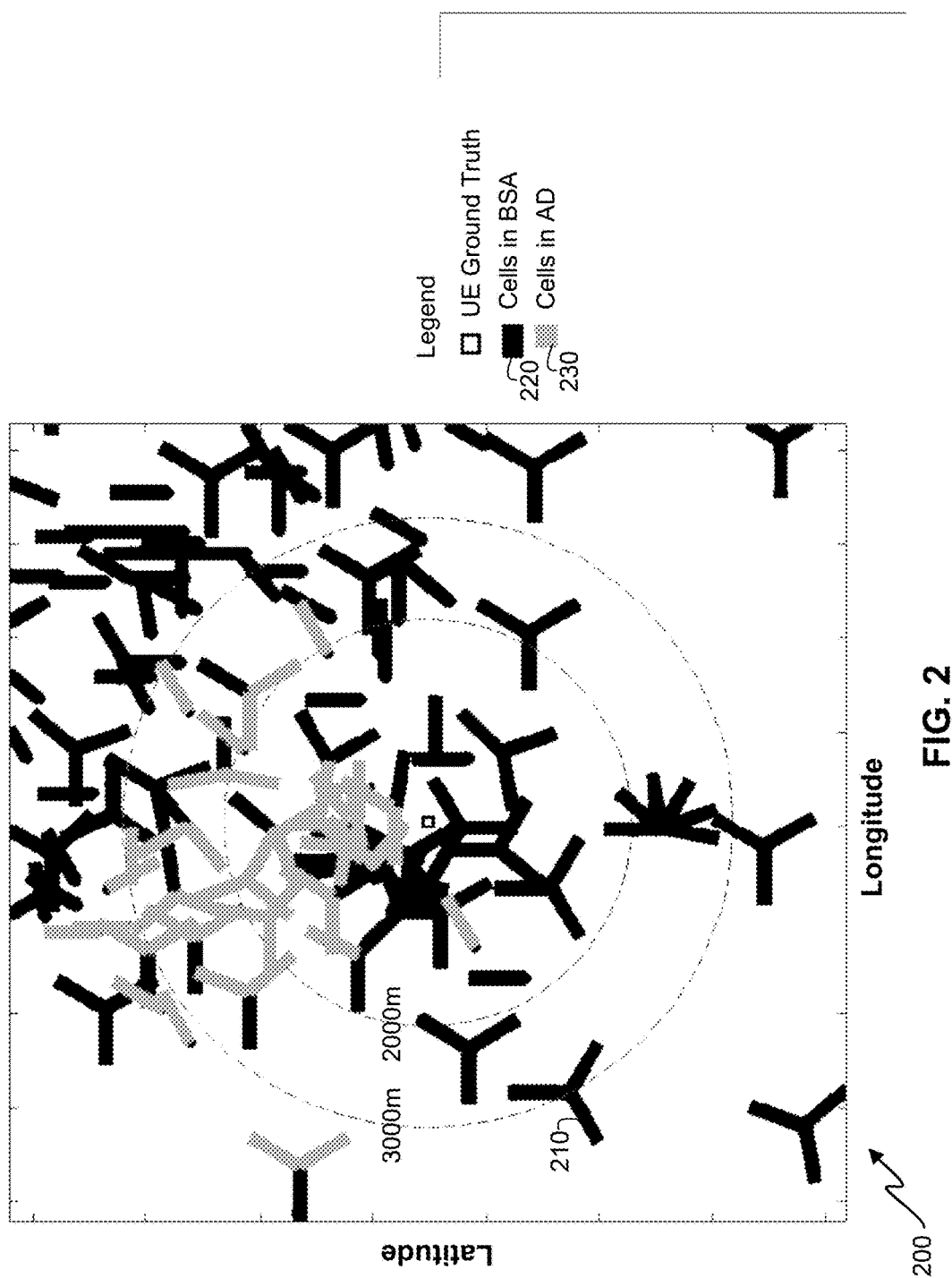
FIG. 2 is an illustration with the graph showing an example of a distribution of cells in a region around a user equipment (UE) (e.g., mobile device).

FIG. 2 is an illustration with the graph 200 showing an example of a distribution of cells in a region around a UE (e.g., mobile device). As indicated in the graph 200, the location (or ground truth) of the UE is located in the center of a geographic region in which a plurality of cells is distributed. Concentric circles in the graph 200 illustrate distances at 2000 m and 3000 m from the UE's location. The data shown in the graph 200 of FIG. 2 reflects real data collected in a field test in which a UE and a location server conducted an OTDOA session. Although the terms "base station" and "cell" are generally used interchangeably herein, it can be noted that base stations typically may typically include three cells, which are usually distributed radially around the base station at 120° increments. Base station 210, for example, is represented in the graph 200 as having three evenly-spaced cells branching out from its center. That said, as shown in the graph 200, some base stations may have a different number of cells and/or have an uneven radial distribution of cells.

The graph 200 further illustrates how a location server may provide assistance data (AD) to the UE with an inaccurate and/or incomplete list of neighboring cells. Here, cells included on the list of neighboring cells provided by the location server are highlighted in a lighter shade 230. Cells having the darker shade 220 are cells that are in the location server's BSA. As can be seen, there are several cells on the list of neighboring cells that are over 3000 m away from the location of the UE. And there are many cells close to the location of the UE that are not included on the list of neighboring cells. These types of inaccuracies in the list of neighboring cells provided by the location server can be due to any of a variety of factors, including errors in the location server's algorithm used to create the list and errors in the location of these cells stored by the location server. Because the list of neighboring cells includes many cells that are not close to the UE and fails to include many cells that are close, the resulting accuracy of a location determination based on measurements of cells on the list of neighboring cells is not as accurate as it could be if the list of neighboring cells included a more accurate list of cells that are relatively close to the location of the UE.

Techniques provided herein help a location server identify these types of inaccuracies in the lists of neighboring cells that it generates by enabling the mobile device to provide measurement information not only for cells on the list of neighboring cells, but also measurement information of additional cells not on the list. With this information, a location server can revisit the algorithms used to create the lists of neighboring cells and revise them accordingly, depending on desired functionality. Furthermore, these techniques may be used in a crowdsourcing environment in which end-user devices are used to provide this additional measurement information, reducing the need for specialized devices to provide in-field testing to determine the accuracy of lists of neighboring cells provided by the location server. According to some embodiments, the implementation of these techniques can be determined by a cellular communication network carrier and/or a base station vendor.

Figure 3:
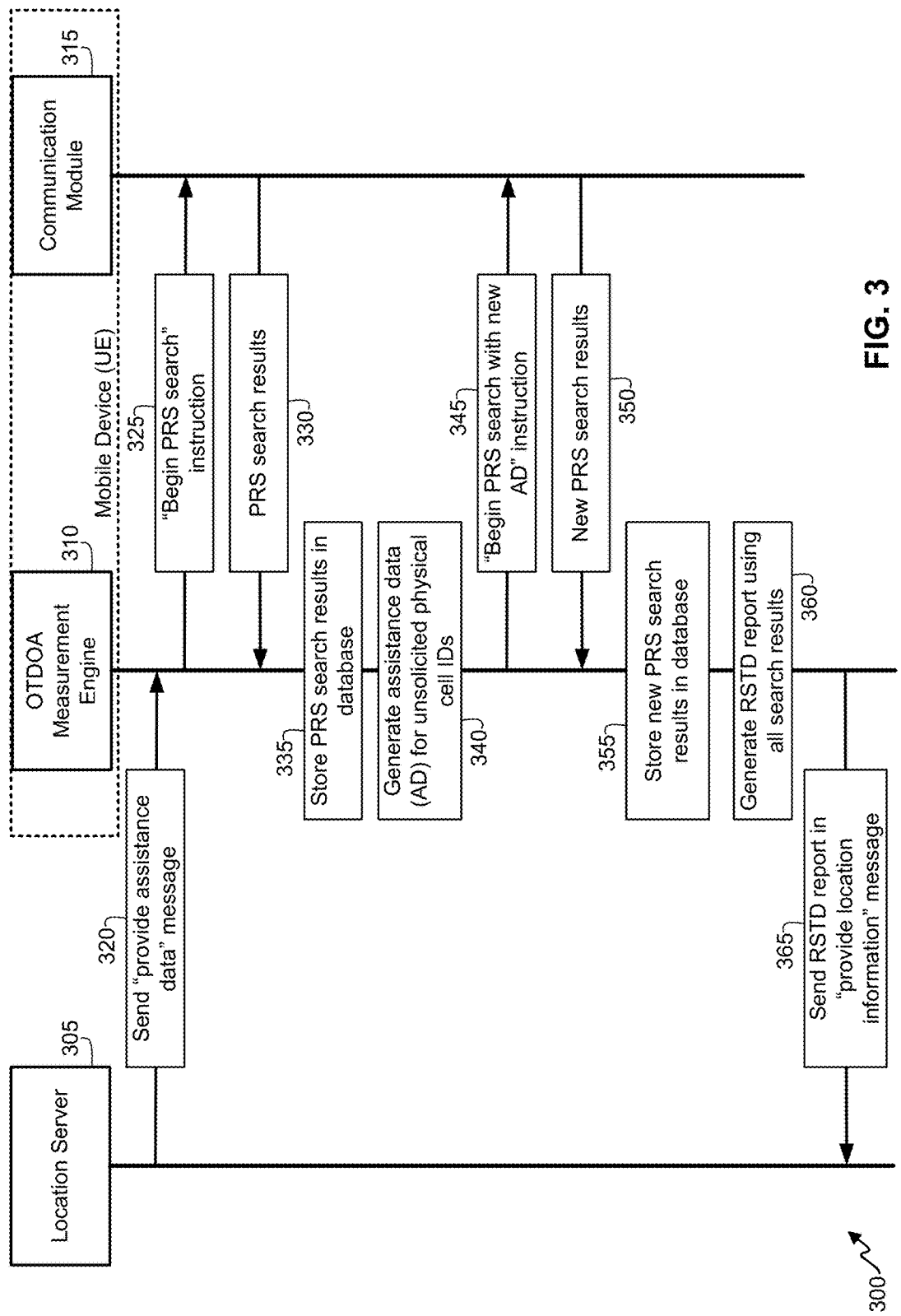
FIG. 3 is a call-flow diagram illustrating a method of enhancing nearest-neighbor cell accuracy, according to one embodiment.
Figure 5:
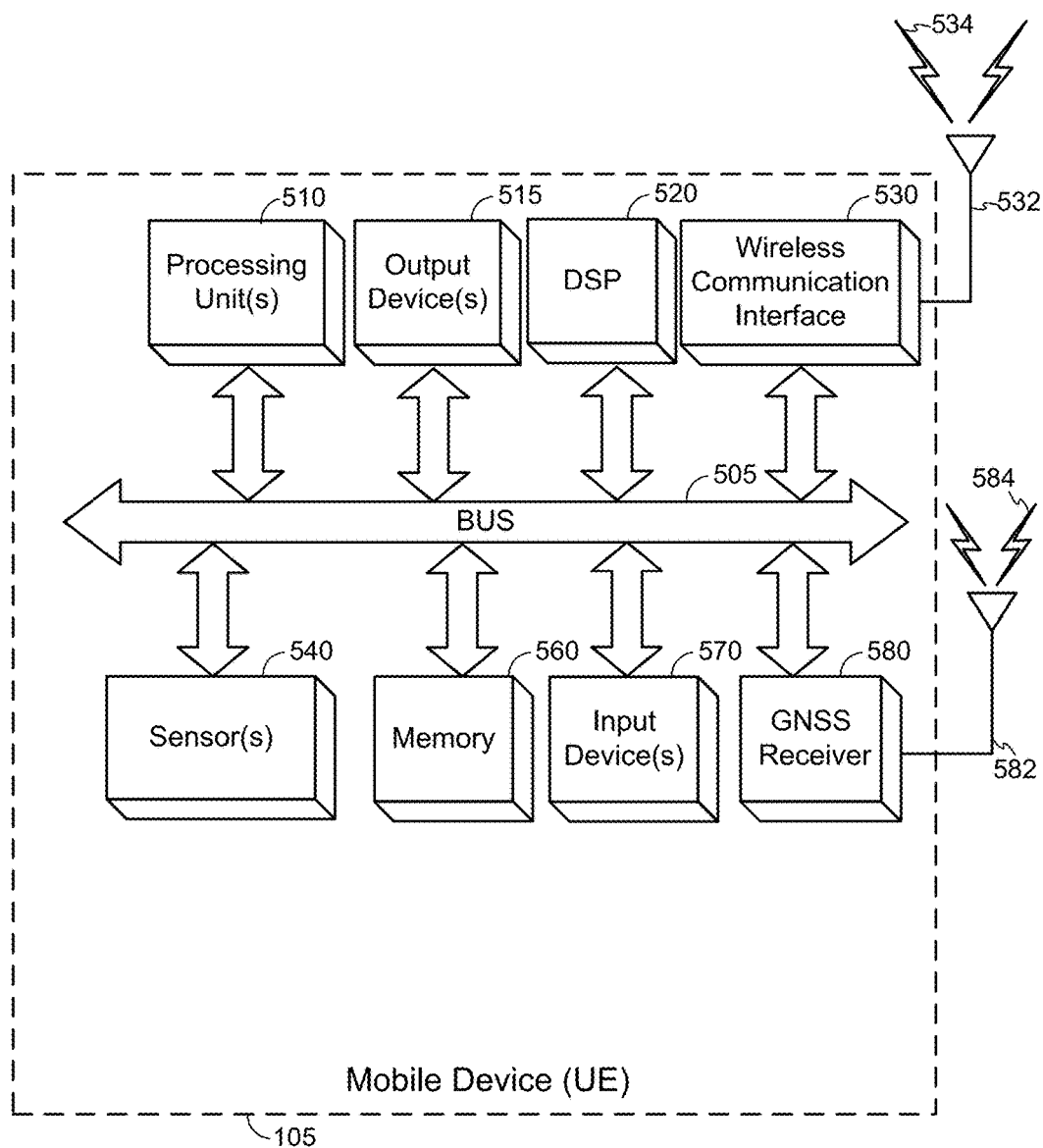
FIG. 5 is a block diagram an embodiment of a mobile device.

FIG. 3 is a call-flow diagram 300 illustrating a method of enhancing nearest-neighbor cell accuracy, according to one embodiment. The call-flow diagram 300 illustrates interaction between three components: a location server 305 (which may correspond to the location server 160 of FIG. 1), an OTDOA measurement engine 310, and a communication module 315. It can be noted that, in some embodiments, the OTDOA measurement engine 310 and the communication module 315 may comprise different components of a mobile device (or UE) (which may correspond to the mobile device 105 of FIG. 1), although these components may be in separate devices in other embodiments. The location server 305, for example, may be implemented by hardware and/or software components of a computing device (which may have hardware and/or software components similar to those of the mobile device illustrated in FIG. 5). The OTDOA measurement engine 310 and the communication module 315 may each be implemented by hardware and/or software components of a mobile device as illustrated in FIG. 5 and described in more detail below. In alternative embodiments, the functions of the OTDOA measurement engine 310 and communication module 315 may be combined and performed by a single component of a mobile device, depending on desired functionality. A person of ordinary skill in the art will further appreciate that alternative embodiments may include changes (e.g., alterations, rearrangements, combinations, etc.) to the messages and/or other functions illustrated in FIG. 3. The method illustrated in FIG. 3 may take place after a mobile device provides the location server 305 with serving cell information in the manner previously indicated.

At block 320, the method begins with the location server 305 sending a "provide assistance data" message to the OTDOA a measurement engine. As part of the assistance data provided, the location server 305 may include a list of neighboring cells for which the communication module 315 can take measurements. As indicated in the embodiments described above, the list of neighboring cells may be compiled by the location server 305 using the serving cell information provided by the mobile device. This can allow the location server 305 to determine an approximate location of the mobile device using stored information regarding the location of the serving cell. (This stored information may be stored in an almanac, such as a BSA.) The location server 305 can further use location information of other cells to identify neighboring cells and formulate the list of neighboring cells provided in the assistance data at block 320.

At block 325, the OTDOA measurement engine 310 instructs the communication module 315 to begin a PRS search using the list of neighboring cells in the assistance data provided at block 320. During the PRS search, the communication module 315 uses the list to scan for a PRS from each cell on the list.

At block 330, the communication module 315 provides PRS search results of the PRS search to the OTDOA measurement engine 310. As indicated previously, these PRS search results may contain PRS data of only a fraction of the cells listed in the list of neighboring cells. However, the communication module 315 can provide the PRS search results at block 330 after taking measures to ensure that the PRS search results are complete and sufficient under the circumstances.

The determination of when to stop the initial PRS search can be made using traditional methods, and are generally up to the mobile device. For example, the mobile device may choose to terminate the procedure after reaching a point of certainty that additional searching will not result in additional usable PRS data. This may be done, for example, after making a predetermined number of measurement attempts, receiving a threshold number of "valid" PRSes, quantifying the PRS search results with a confidence value (e.g., based on signal-to-noise ratio (SNR) and/or other features of detected PRSes) above a threshold confidence value, and/or implementing other techniques, depending on desired functionality.

It can be noted that PRS search results may only include measurements for PRS signals that are "valid." Here, a "valid" PRS is a PRS detected by the communication module 315 that has an SNR above a certain threshold. For example, if the location server 305 provides a list of neighboring cells comprising 24 cells, a mobile device may only receive valid PRS signals from 5-6 of them.

At block 335, the OTDOA measurement engine 310 stores the PRS search results in a database. It will be understood that data structures other than a database can be used. Moreover, the location and/or type of physical memory used to store the PRS search results on the mobile device can vary, depending on desired functionality.

At that point, the OTDOA measurement engine 310 can determine whether to conduct an additional PRS search of cells not on the list of neighboring cells. The OTDOA measurement engine 310 may make this determination based on whether there is sufficient time to conduct the additional PRS search in light of applicable protocols and/or explicit time limits provided by the location server 305. For example, in some embodiments, the location server 305 may define a timeout period in the assistance data provided in block 320 during which the mobile device is to respond to the location server 305. Thus, once the initial PRS search results are obtained and stored at the mobile device, the OTDOA measurement engine 310 can then determine an amount of time left in the timeout period and conduct an additional PRS search of cells not in the list of neighboring cells if time allows. In some embodiments, the OTDOA measurement engine 310 may adapt the additional PRS search based on the amount of time left, conducting a PRS search of many cells if there is a relatively large amount of time left or conducting a PRS search of relatively few cells if there is relatively small amount of time left.

After determining that an additional PRS search can be conducted, the OTDOA measurement engine 310 may proceed with the functionality at block 340 by generating assistance data (AD) for unsolicited physical cell IDs (PCIs). In other words, the OTDOA measurement engine 310 may create assistance data provides the communication module 315 with sufficient information to allow the communication module 315 to conduct the additional PRS search of cells that are not on the list of neighboring cells. This assistance data can include, for example, a list of generated PC's of cells not on the list of neighboring cells.

The generation of assistance data can vary depending on the type of wireless technologies used by the communication module 315. For example, the communication module 315 may comprise a Long-Term Evolution (LTE) module. According to current Long-Term Evolution (LTE) standards, the PCI of a cell may comprise a value ranging from 0 to 503. Therefore, the list of neighboring cells provided by the location server 305 in the assistance data at block 320 may include the PC's of neighboring cells with which the mobile device can take measurements. If, for example, the list of 24 neighboring cells includes cells with PCI values of 0-23, the mobile device can then conduct a search for PRS signals having those values in accordance with traditional OTDOA session protocols. According to these protocols, for example, the location server 305 may give the mobile device 12 seconds in which the mobile device is to complete the PRS search and provide RSTD measurement results based on the PRS search results back to the location server. If the mobile device completes the PRS search in five seconds, for example, the mobile device may utilize the remaining seven seconds to conduct an additional PRS search of neighboring cells that are not on the list of neighboring cells. To enable this additional PRS search, the assistance data generated at block 340 by the OTDOA measurement engine 310 can include generated PC's for these neighboring cells that are not on the list of neighboring cells (e.g., cells with a PCI value of 24-503).

At block 345 the OTDOA measurement engine 310 instructs the communication module to begin an additional PRS search with the new assistance data generated at block 340, and the new PRS search results are sent back to and stored by the OTDOA measurement engine 310 at blocks 350 and 355 respectively, in a manner similar to the respective functionality of blocks 330 and 335.

At block 360, the OTDOA measurement engine 310 generates an RSTD report that includes RSTD measurements based on all PRS search results (i.e., PRS search results obtained at both block 330 and 350), which is then provided to the location server 305 in a "provide location information" message at block 365. The format of this RSTD report can vary, depending on desired functionality. In some embodiments, RSTD measurements from PRS search results of block 350 (from cells not on the list of neighboring cells) may be distinguished, in the report, from RSTD measurements from PRS search results obtained at block 330 (from cells on the list). In other embodiments, the RSTD report may simply include a list of PCIs of cells and corresponding RSTD measurements (which are indicative of a distance between the mobile device and the cell), in which case it may be up to the location server 305 to determine which PCIs in the report correspond to PCIs of cells in the list of neighboring cells provided at block 320. In alternative embodiments, the OTDOA measurement engine 310 may provide indications (e.g., based on PRS or similar search results), other than RSTD measurements, of a distances between the mobile device and cells that are both included and not included on the list of neighboring cells.

The location server 305 can use the additional RSTD measurement information of cells not on the list of neighboring cells to modify its algorithms for generating lists of neighboring cells to increase their accuracy. For example, because the RSTD report includes RSTD measurements indicative of a distance between the mobile device and various cells, the location server 305 may be able to identify instances in which a cell on the list of neighboring cells is much further away than a cell that may not be on the list. The location server 305 can then use this information for example, in a learning algorithm to help optimize the underlying algorithms used to determine the neighboring cells and reduce the chance that inaccuracies occur in the future. Additionally or alternatively, the location server may simply choose to ignore the additional information provided in the RSTD report.

Figure 4:
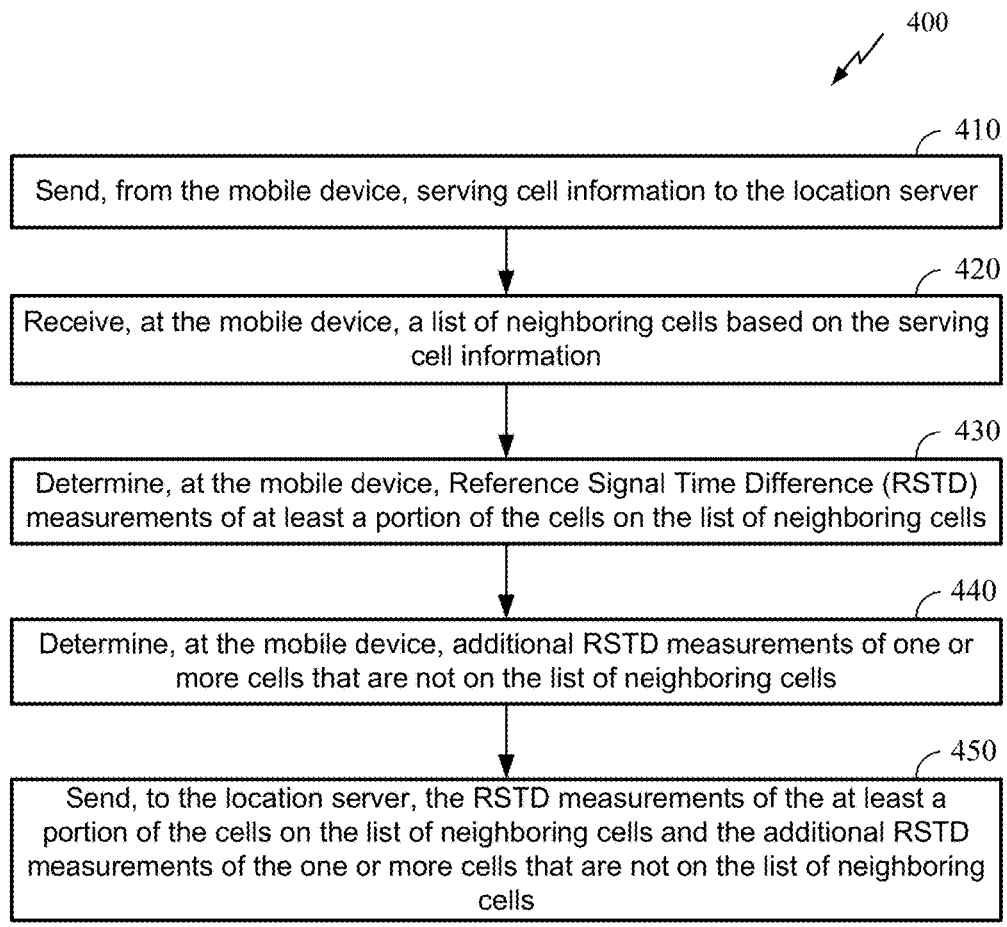
FIG. 4 is a flow diagram of a method of providing measurement information to a location server for position determination of a mobile device, according to an embodiment.

FIG. 4 is a flow diagram of a method 400 of providing measurement information to a location server for position determination of a mobile device, according to an embodiment. It can be noted that the functions shown in the blocks illustrated in FIG. 4 can be rearranged or altered in alternative embodiments, depending on desired functionality. In some embodiments, some or all of the functions may be performed during an OTDOA session between a mobile device and a location server. Means for performing one or more of the illustrated functions can include hardware and/or software means described herein, including the hardware and/or software components illustrated in FIG. 5 and described below.

The functionality at block 410 includes sending, from the mobile device, serving cell information to the location server. As indicated in embodiments previously described herein, this information can be information used by the location server to enable the location server to determine an approximate location of the mobile device can provide a corresponding list of neighboring cells. According to some embodiments, the serving cell information can include at least one of an MNC, MCC, or PCI, or any combination thereof. In some embodiments, this information can be obtained by the mobile device from the serving cell. Means for performing the functionality at block 410 can include, for example, a processing unit(s) 510, bus 505, memory 560, and/or wireless communication interface 530 of a mobile device, as shown in FIG. 5 and described below.

At block 420, the mobile device receives a list of neighboring cells based on the serving cell information. This list may be sent to the mobile device in an "assistance data" message/format and may include the PCIs of neighboring cells for which the location server has location information, enabling the location server to calculate a location of the mobile device once distances from the mobile device to at least some of the neighboring cells is determined. Means for performing the functionality at block 420 can include, for example, a processing unit(s) 510, bus 505, memory 560, and/or wireless communication interface 530 of a mobile device, as shown in FIG. 5 and described below.

At block 430, the mobile device determines RSTD measurements of at least a portion of the cells on the list of neighboring cells. As indicated in embodiments described herein, these RSTD measurements can be determined using PRS search results, including information regarding a PRS of each neighboring cell on the list that was received by the mobile device. According to some embodiments, a PRS received by the mobile device may not be used for RSTD measurements unless it has an SNR value greater than a threshold value. Additionally or alternatively, as noted previously, the mobile device may take certain actions to ensure that RSTD measurements of the at least a portion of the cells on the list of neighboring cells have a confidence value above a threshold level, by, for example, ensuring that corresponding PRSes have SNR values greater than a threshold value, a PRS is detected a minimum number of times, and the like. According to some embodiments, the functionality of block 430 will terminate once a confidence value above a threshold level has been attained. Means for performing the functionality at block 430 can include, for example, a processing unit(s) 510, bus 505, memory 560, DSP 520, and/or wireless communication interface 530 of a mobile device, as shown in FIG. 5 and described below.

At block 440, the mobile device determines additional RSTD measurements of one or more cells that are not on the list of neighboring cells. As indicated previously, this can be done during a designated timeout period if the mobile device determines that it has sufficient time to determine the additional RSTD measurements. The additional RSTD measurements may be determined by scanning for PRSes of the cells that are not on the list of neighboring cells. To do so, the mobile device may internally generate assistance data with which PRSes of the cells that are not on the list of neighboring cells are scanned. As indicated previously, a measurement engine may be used to generate the assistance data (in which case a communication interface of the mobile device may determine the additional RSTD measurements). In some embodiments, the assistance data may comprise generated PCI values of cells. As with the measurements of the at least a portion of the cells on the list of neighboring cells, the RSTD measurements of one or more cells that are not on the list of neighboring cells may be based on PRSes that have a minimum threshold SNR. That is, the mobile device may receive a PRS from each of the plurality of cells, and the one or more cells that are not on the list of neighboring cells from which the additional RSTD measurements are determined may comprise cells for which an SNR of the PRS was greater than a threshold value. Means for performing the functionality at block 440 can include, for example, a processing unit(s) 510, bus 505, memory 560, DSP 520, and/or wireless communication interface 530 of a mobile device, as shown in FIG. 5 and described below.

At block 450, the mobile device sends the location server the RSTD measurements of both the at least a portion of cells on the list of the neighboring cells and the one or more cells that are not on the list of neighboring cells. These measurements may be combined in a single report that is included in a message, such as a "provide location information" message, provided to the location server. The report may or may not indicate which measurements are taken of cells that are not on the list of neighboring cells. The location server can then, according to its own discretion, utilize the additional measurement information provided in the report to modify and/or optimize the algorithms that uses to generate neighboring cell lists. Means for performing the functionality at block 450 can include, for example, a processing unit(s) 510, bus 505, memory 560, and/or wireless communication interface 530 of a mobile device, as shown in FIG. 5 and described below.

FIG. 5 is a block diagram an embodiment of a mobile device 105 (or UE), which can be utilized as described herein above. For example, the mobile device 105 can be used in the positioning system 100 of FIG. 1, perform functions shown in the call-flow diagram 300 of FIG. 3, perform some or all of the method 400 of FIG. 4, and/or be used as generally described in the embodiments detailed herein. It should be noted that FIG. 5 is meant only to provide a generalized illustration of various components, any or all of which may be utilized as appropriate. It can be noted that, in some instances, components illustrated by FIG. 5 can be localized to a single physical device and/or distributed among various networked devices, which may be disposed at different physical locations.

The mobile device 105 is shown comprising hardware elements that can be electrically coupled via a bus 505 (or may otherwise be in communication, as appropriate). The hardware elements may include a processing unit(s) 510 which may comprise without limitation one or more general-purpose processors, one or more special-purpose processors (such as digital signal processing (DSP) chips, graphics acceleration processors, application specific integrated circuits (ASICs), field-programmable gate arrays (FPGAs)m and/or the like), and/or other processing structure or means, which can be configured to perform one or more of the methods described herein. In some embodiments, all or a portion of the OTDOA measurement engine 310 of FIG. 3 may be implemented by the wireless communication interface 530. As shown in FIG. 5, some embodiments may have a separate DSP 520, depending on desired functionality. The mobile device 105 also may comprise one or more input devices 570, which may comprise without limitation one or more touch screens, touch pads, microphones, buttons, dials, switches, and/or the like; and one or more output devices 515, which may comprise without limitation, one or more displays, light emitting diodes (LEDs), speakers, and/or the like.

The mobile device 105 might also include a wireless communication interface 530, which may comprise without limitation a modem, a network card, an infrared communication device, a wireless communication device, and/or a chipset (such as a Bluetooth® device, an IEEE 802.11 device, an IEEE 802.15.4 device, a Wi-Fi® device, a WiMAX® device, cellular communication circuitry, etc.), and/or the like. The wireless communication interface 530 may permit data (such as location information and/or location assistance information as described in the embodiments herein) to be communicated with a network, wireless access points, computer systems, and/or any other wireless electronic devices described herein, including the devices illustrated in FIG. 1. The communication can be carried out via one or more wireless communication antenna(s) 532 that send and/or receive wireless signals 534. In some embodiments, all or a portion of the communication module 315 of FIG. 3 and/or all or a portion of the OTDOA measurement engine may be implemented by the wireless communication interface 530.

Depending on desired functionality, the wireless communication interface 530 may comprise separate transceivers to communicate with base transceiver stations (e.g., cellular transceiver 120 of FIG. 1) and other wireless devices and access points. Different data networks may comprise various network types. The wireless communication interface 530 may communicate with a Wireless Wide Area Network (WWAN), which may comprise a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 502.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless data network as described herein may comprise a wireless local area network (WLAN) which may be an IEEE 802.11x network, and a wireless personal area network (WPAN) may comprise a Bluetooth® network, an IEEE 802.15x, or some other type of network. The techniques described herein may also be used with any combination of WWAN, WLAN, and/or WPAN.

The mobile device 105 can further include sensor(s) 540. Such sensors may comprise, without limitation, one or more accelerometers, gyroscopes, cameras, magnetometers, altimeters, microphones, proximity sensors, light sensors, and the like. Sensor(s) 540 may be used in additional or alternative manners to facilitate a positioning determination by a positioning system (such as positioning system 100 of FIG. 1) by providing measurements for dead reckoning and/or similar functions.

Embodiments of the mobile device may also include GNSS receiver 580 capable of receiving signals 584 from one or more GNSS SVs (such as GNSS SVs 110, of FIG. 1) using an GNSS antenna 582. Such positioning can be utilized to complement and/or incorporate the techniques described herein. The GNSS receiver 580 can extract a position of the mobile device, using conventional techniques, from GNSS SVs of a GNSS system, such as Galileo, GLONASS, Compass, Quasi-Zenith Satellite System (QZSS) over Japan, Indian Regional Navigational Satellite System (IRNSS) over India, Beidou over China, and/or the like. Moreover, the GNSS receiver 580 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an GNSS may include any combination of one or more global and/or regional navigation satellite systems and/or augmentation systems, and GNSS signals may include GNSS, GNSS-like, and/or other signals associated with such one or more GNSS. In other words, GNSS system may comprise any type of Satellite Positioning System (SPS).

The mobile device 105 may further include and/or be in communication with a memory 560. The memory 560 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 560 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 105 (e.g., by processing unit(s)) and/or another device of a positioning system. In an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the memory 560 described above. These instructions might take the form of executable code, which is executable by the mobile device 105 and/or might take the form of source and/or installable code, which, upon compilation and/or installation on the mobile device 105 (e.g., using any of a variety of generally available compilers, installation programs, compression/decompression utilities, etc.), then takes the form of executable code.

The techniques described herein may be implemented by various means depending upon applications according to particular features and/or examples. For example, such methodologies may be implemented in hardware, firmware, and/or combinations thereof, along with software. In a hardware implementation, for example, a processing unit (e.g., processing unit(s) 510) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform, such as the memory 560 of the mobile device 105 shown in FIG. 5. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of providing measurement information to a location server for position determination of a mobile device, the method comprising:
    sending, as part of an Observed Time Difference of Arrival (OTDOA) session, serving cell information from the mobile device to the location server;
    receiving, at the mobile device from the location server, a list of neighboring cells based on the serving cell information;
    determining, at the mobile device, a length of time of a designated timeout period associated with the OTDOA session based on information received at the mobile device from the location server;
    in response to receiving the list of neighboring cells, determining, at the mobile device during the designated timeout period, Reference Signal Time Difference (RSTD) measurements of at least a portion of the cells on the list of neighboring cells;
    after determining the RSTD measurements of the at least a portion of the cells of the list of neighboring cells, determining, at the mobile device, that an amount of time left in the timeout period exceeds a threshold value;
    in response to determining that the amount of time left in the timeout period exceeds the threshold value, determining, at the mobile device during the designated timeout period, additional RSTD measurements of one or more cells that are not on the list of neighboring cells; and
    sending, from the mobile device to the location server during the OTDOA session, the RSTD measurements of both the at least a portion of the cells on the list of neighboring cells and the one or more cells that are not on the list of neighboring cells.

2. The method of claim 1, wherein determining the additional RSTD measurements comprises receiving a Positioning Reference Signal (PRS) from each of a plurality of cells that are not on the list of neighboring cells, wherein the one or more cells that are not on the list of neighboring cells comprise cells of the plurality of cells for which a signal-to-noise ratio of the PRS was greater than a threshold value.

3. The method of claim 1, further comprising generating, with the mobile device, assistance data with which the additional RTSD measurements are determined.

4. The method of claim 3, wherein the assistance data is generated by a measurement engine of the mobile device and the additional RTSD measurements are determined by a communication interface of the mobile device.

5. The method of claim 3, wherein the assistance data includes a physical cell identifier (PCI) of each of the one or more cells that is not on the list of neighboring cells.

6. The method of claim 1, wherein the serving cell information comprises at least one of a mobile network code (MNC), a mobile carrier code (MCC), or a physical cell identifier (PCI), or any combination thereof.

7. A mobile device:
    a wireless communication interface;
    a memory; and
    a processing unit communicatively coupled with the wireless communication interface and the memory, the processing unit configured to cause the mobile device to:
        send, via the wireless communication interface as part of an Observed Time Difference of Arrival (OTDOA) session, serving cell information to a location server;

receive, from the location server via the wireless communication interface, a list of neighboring cells based on the serving cell information;

determine a length of time of a designated timeout period associated with the OTDOA session based on information received from the location server;

in response to receiving the list of neighboring cells, determine, during the designated timeout period, Reference Signal Time Difference (RSTD) measurements of at least a portion of the cells on the list of neighboring cells;

after determining the RSTD measurements of the at least a portion of the cells of the list of neighboring cells, determine that an amount of time left in the timeout period exceeds a threshold value;

in response to determining that the amount of time left in the timeout period exceeds the threshold value, determine, during the designated timeout period, additional RSTD measurements of one or more cells that are not on the list of neighboring cells; and send, via the wireless communication interface to the location server during the OTDOA session, the RSTD measurements of both the at least a portion of the cells on the list of neighboring cells and the one or more cells that are not on the list of neighboring cells.

8. The mobile device of claim 7, wherein the processing unit is further configured to cause the mobile device to determine the additional RSTD measurements by receiving a Positioning Reference Signal (PRS) from each of a plurality of cells that are not on the list of neighboring cells, wherein the one or more cells that are not on the list of neighboring cells comprise cells of the plurality of cells for which a signal-to-noise ratio of the PRS was greater than a threshold value.

9. The mobile device of claim 7, wherein the processing unit is further configured to cause the mobile device to generate assistance data with which the additional RTSD measurements are determined.

10. The mobile device of claim 9, further comprising a measurement engine, wherein the assistance data is generated by the measurement engine and the additional RTSD measurements are determined by the wireless communication interface.

11. The mobile device of claim 9, wherein the processing unit is further configured to cause the mobile device to receive the assistance data that includes a physical cell identifier (PCI) of each of the one or more cells that is not on the list of neighboring cells.

12. The mobile device of claim 7, wherein the processing unit is further configured to cause the mobile device to send the RSTD measurements of both the at least a portion of the cells on the list of neighboring cells and the one or more cells that are not on the list of neighboring cells during an Observed Time Difference of Arrival (OTDOA) session between the mobile device and the location server.

13. The mobile device of claim 7, wherein the processing unit is further configured to cause the mobile device to include, in the serving cell information, at least one of a mobile network code (MNC), a mobile carrier code (MCC), or a physical cell identifier (PCI), or any combination thereof.

14. An apparatus comprising:
means for sending serving cell information from the apparatus to a location server as part of an Observed Time Difference of Arrival (OTDOA) session;

means for receiving, from the location server, a list of neighboring cells based on the serving cell information;

means for determining a length of time of a designated timeout period associated with the OTDOA session based on information received at the apparatus from the location server;

means for, in response to receiving the list of neighboring cells, determining, during the designated timeout period, Reference Signal Time Difference (RSTD) measurements of at least a portion of the cells on the list of neighboring cells;

means for determining, after determining the RSTD measurements of the at least a portion of the cells of the list of neighboring cells, that an amount of time left in the timeout period exceeds a threshold value;

means for determining, during the designated timeout period, additional RSTD measurements of one or more cells that are not on the list of neighboring cells, in response to determining that the amount of time left in the timeout period exceeds the threshold value; and means for sending, to the location server during the OTDOA session, the RSTD measurements of both the at least a portion of the cells on the list of neighboring cells and the one or more cells that are not on the list of neighboring cells.

15. The apparatus of claim 14, wherein the means for determining the additional RSTD measurements comprises means for receiving a Positioning Reference Signal (PRS) from each of a plurality of cells that are not on the list of neighboring cells, wherein the one or more cells that are not on the list of neighboring cells comprise cells of the plurality of cells for which a signal-to-noise ratio of the PRS was greater than a threshold value.

16. The apparatus of claim 14, further comprising means for generating assistance data with which the additional RTSD measurements are determined.

17. The apparatus of claim 16, wherein the assistance data is generated by a measurement means and the additional RTSD measurements are determined by a communication means.

18. The apparatus of claim 16, wherein means for generating assistance data includes means for including, in the assistance data, a physical cell identifier (PCI) of each of the one or more cells that is not on the list of neighboring cells.

19. The apparatus of claim 14, further comprising means for including, in the serving cell information, at least one of a mobile network code (MNC), a mobile carrier code (MCC), or a physical cell identifier (PCI), or any combination thereof.

20. A non-transitory computer-readable medium having instructions embedded therein for providing measurement information to a location server for position determination of a mobile device, the instructions including computer code for:

sending serving cell information to the location server from the mobile device as part of an Observed Time Difference of Arrival (OTDOA) session;

receiving, at the mobile device from the location server, a list of neighboring cells based on the serving cell information;

determining a length of time of a designated timeout period associated with the OTDOA session based on information received at the mobile device from the location server;

in response to receiving the list of neighboring cells, determining, during the designated timeout period, Reference Signal Time Difference (RSTD) measurements of at least a portion of the cells on the list of neighboring cells;

after determining the RSTD measurements of the at least a portion of the cells of the list of neighboring cells, determining that an amount of time left in the timeout period exceeds a threshold value;

in response to determining that the amount of time left in the timeout period exceeds the threshold value, determining, during the designated timeout period, additional RSTD measurements of one or more cells that are not on the list of neighboring cells; and sending, from the mobile device to the location server during the OTDOA session, the RSTD measurements of both the at least a portion of the cells on the list of neighboring cells and the one or more cells that are not on the list of neighboring cells.

21. The non-transitory computer-readable medium of claim 20, wherein the computer code for determining the additional RSTD measurements comprises computer code for receiving a Positioning Reference Signal (PRS) from each of a plurality of cells that are not on the list of neighboring cells, wherein the one or more cells that are not on the list of neighboring cells comprise cells of the plurality of cells for which a signal-to-noise ratio of the PRS was greater than a threshold value.

22. The non-transitory computer-readable medium of claim 20, wherein the instructions further comprise computer code for generating assistance data with which the additional RTSD measurements are determined.

23. The non-transitory computer-readable medium of claim 20, wherein the instructions further comprise computer code for including, in the serving cell information, at least one of a mobile network code (MNC), a mobile carrier code (MCC), or a physical cell identifier (PCI), or any combination thereof.

* * * * *